United States Patent
Long et al.

(10) Patent No.: US 11,347,794 B2
(45) Date of Patent: May 31, 2022

(54) NON-UNIQUE SECONDARY INDEXING OF SEMI-STRUCTURED DATA IN DATABASES

(71) Applicant: Teradata US, Inc., Dayton, OH (US)

(72) Inventors: Yu Long, San Diego, CA (US); Judy Wu, San Diego, CA (US); Preeti Javaji, San Diego, CA (US); Gregory Howard Milby, San Marcos, CA (US); Steven B. Cohen, Redondo Beach, CA (US)

(73) Assignee: Teradata US, Inc., San Diego, CA (US)

( * ) Notice: Subject to any disclaimer, the term of this patent is extended or adjusted under 35 U.S.C. 154(b) by 374 days.

(21) Appl. No.: 15/386,049

(22) Filed: Dec. 21, 2016

(65) Prior Publication Data
US 2017/0235845 A1   Aug. 17, 2017

Related U.S. Application Data

(60) Provisional application No. 62/272,424, filed on Dec. 29, 2015.

(51) Int. Cl.
| | | |
|---|---|---|
| *G06F 16/00* | (2019.01) | |
| *G06F 16/81* | (2019.01) | |
| *G06F 16/22* | (2019.01) | |

(52) U.S. Cl.
CPC .............. *G06F 16/81* (2019.01); *G06F 16/22* (2019.01)

(58) Field of Classification Search
CPC .......... G06F 16/221; G06F 16/22; G06F 16/81
USPC .......................................................... 707/741
See application file for complete search history.

(56) References Cited

U.S. PATENT DOCUMENTS

| | | | | |
|---|---|---|---|---|
| 5,960,194 | A  * | 9/1999 | Choy ...................... G06F 9/355 |
| 2004/0103077 | A1 * | 5/2004 | Hollines, III ........... G06F 16/22 |
| 2014/0250067 | A1 * | 9/2014 | Calkowski ............. G06F 16/178 |
| | | | | 707/624 |
| 2014/0330785 | A1 * | 11/2014 | Isherwood .......... G06F 11/1435 |
| | | | | 707/640 |
| 2015/0331909 | A1 * | 11/2015 | Sundquist ............. G06F 16/248 |
| | | | | 707/722 |
| 2017/0177604 | A1 * | 6/2017 | Geissinger ............ G06F 8/4434 |

OTHER PUBLICATIONS

Larson et al., "Columnar Storage in SQL Server 2012", 2012, IEEE. (Year: 2012).*

* cited by examiner

*Primary Examiner* — Chelcie L Daye

(74) *Attorney, Agent, or Firm* — Randy L. Campbell, Jr.

(57) ABSTRACT

Various embodiments herein each include at least one of systems, methods, and software for generating, storing, and using non-unique secondary indexes of semi-structured data in database tables. One method embodiment includes creating and storing a non-unique secondary index (NUSI) for a database table based on column data stored in rows of the database table. The NUSI in some such embodiments identifying an offset to specific data included in the column data of at least some rows of the database table where the specific data is located. Other embodiments include building a NUSI index that includes values embedded therein.

14 Claims, 7 Drawing Sheets

| INDEX ROWID | | INDEX KEY VALUE | BASE TABLE ROWID1, OFFSET TO OBJECT 1 | BASE TABLE ROWID1, OFFSET TO OBJECT 2 | BASE TABLE ROWID2, OFFSET TO OBJECT 1 | BASE TABLE ROWID2, OFFSET TO OBJECT 2 | ... |
|---|---|---|---|---|---|---|---|
| HASH | UNIQUE | | | | | | |

| INDEX ROWID | INDEX KEY VALUE | BASE TABLE ROWID | BASE TABLE ROWID | BASE TABLE ROWID | ... |
| HASH | UNIQUE | | | | | |

FIG. 1

| INDEX ROWID | | INDEX KEY VALUE | BASE TABLE ROWID1, OFFSET TO OBJECT 1 | BASE TABLE ROWID1, OFFSET TO OBJECT 2 | BASE TABLE ROWID2, OFFSET TO OBJECT 1 | BASE TABLE ROWID2, OFFSET TO OBJECT 2 | ... |
|---|---|---|---|---|---|---|---|
| HASH | UNIQUE | | | | | | |

*FIG. 2*

Base Table Row 1 Contains

```
{ "store": {
    "book": [
      { "category": "reference",
        "author": "Nigel Rees",
        "title": "Sayings of the Century",
        "price": 8.95
      },
      { "category": "fiction",
        "author": "Evelyn Waugh",
        "title": "Sword of Honour",
        "price": 12.99
      },
    ],
    "bicycle": {
      "color": "red",
      "price": 19.95
    }
  }
}
```

*offset to object1a*

*offset to object2a*

Base Table Row 2 Contains

```
{ "store": {
    "book": [
      { "category": "fiction",
        "author": "Herman Melville",
        "title": "Moby Dick",
        "isbn": "0-553-21311-3",
        "price": 8.99
      },
      { "category": "fiction",
        "author": "Nigel Rees",
        "title": "My Radio Times",
        "isbn": "978-1-482399-46-2",
        "price": 12.99
      },
    ],
  }
}
```

*offset to object1b*

*offset to object2b*

FIG. 3

| | Key | Base Table References(RowID, Object offset) |
|---|---|---|
| Index Row#1 | "Nigel Rees" | Rowid1, offset to object 1a, Rowid2, offset to object2b |
| Index row#2 | "Evelyn Waugh" | Rowid1, offset to object 2a |
| Index row#3 | "Herman Melville" | Rowid2, offset to object 1b |

*FIG. 4*

| INDEX ROWID | INDEX KEY VALUE | BASE TABLE ROWID1, LENGTH OF OBJECT1, OBJECT1'S VALUE | BASE TABLE ROWID1, LENGTH OF OBJECT2, OBJECT2'S VALUE | BASE TABLE ROWID2, LENGTH OF OBJECT1, OBJECT1'S VALUE | BASE TABLE ROWID2, LENGTH OF OBJECT2, OBJECT2'S VALUE | ... |

FIG. 5

| | Key | Base Table References(RowID + object length + object value) |
|---|---|---|
| Index row#1 | "Nigel Rees" | Rowid1+ length of object1a + { "category": "reference",<br>"author": "Nigel Rees",<br>"title": "Sayings of the Century",<br>"price": 8.95<br>}<br>, Rowid2+ length of object2b + { "category": "fiction",<br>"author": "Nigel Rees",<br>"title": "My Radio Times",<br>"isbn": "978-1-48299-46-2",<br>"price": 12.99<br>} |
| Index row#2 | "Evelyn Waugh" | Rowid1+ length of object2a + { "category": "fiction",<br>"author": "Evelyn Waugh",<br>"title": "Sword of Honour",<br>"price": 12.99<br>} |
| Index row#3 | "Herman Melville" | Rowid2+ length of object1b + { "category": "fiction",<br>"author": "Herman Melville",<br>"title": "Moby Dick",<br>"isbn": "0-553-21311-3",<br>"price": 8.99<br>} |

*FIG. 6*

NON-UNIQUE SECONDARY INDEXING OF SEMI-STRUCTURED DATA IN DATABASES

PRIORITY APPLICATIONS

This application claims the benefit of priority to U.S. Provisional Patent Application Ser. No. 62/272,424, filed Dec. 29, 2015, the content of which is hereby incorporated by reference in its entirety.

BACKGROUND INFORMATION

Data can be an abstract term. In the context of computing environments and systems, data can generally encompass all forms of information storable in a computer readable medium (e.g., memory, hard disk). Data, and in particular, one or more instances of data can also be referred to as data object(s). As is generally known in the art, a data object can, for example, be an actual instance of data, a class, a type, or a particular form of data, and so onData can be an abstract term. In the context of computing environments and systems, data can generally encompass all forms of information storable in a computer readable medium (e.g., memory, hard disk). Data, and in particular, one or more instances of data can also be referred to as data object(s). As is generally known in the art, a data object can, for example, be an actual instance of data, a class, a type, or a particular form of data, and so on.

Generally, one important aspect of computing and computing systems is storage of data. Today, there is an ever increasing need to manage storage of data in computing environments. Databases are good examples of computing environments or systems where the storage of data can be crucial. As such, databases are discussed below in greater detail as an example.

The term database can also refer to a collection of data and/or data structures typically stored in a digital form. Data can be stored in a database for various reasons and to serve various entities or "users." Generally, data stored in the database can be used by one or more of the "database users." A user of a database can, for example, be a person, a database administrator, a computer application designed to interact with a database, etc. A very simple database or database system can, for example, be provided on a Personal Computer (PC) by storing data (e.g., contact information) on a Hard Disk and executing a computer program that allows access to the data. Databases may also be provided as a cloud-based, network accessible resource accessible by numerous devices of various device types via the internet. The executable computer program can be referred to as a database program, or a database management program or database management system. The executable computer program can, for example, retrieve and display data (e.g., a list of names with their phone numbers) based on a request submitted by a person (e.g., show me the phone numbers of all my friends in Ohio).

Generally, database systems are much more complex than the example noted above. In addition, databases have been evolved over the years and are used in various business and organizations (e.g., banks, retail stores, governmental agencies, universities). Today, databases can be very complex. Some databases can support several users simultaneously and allow them to make very complex queries (e.g., give me the names of all customers under the age of thirty-five (35) in Ohio that have bought all the items in a given list of items in the past month and also have bought a ticket for a baseball game and purchased a baseball hat in the past 10 years).

Typically, a Database Manager (DBM) or a Database Management System (DBMS) is provided for relatively large and/or complex databases. As known in the art, a DBMS can effectively manage the database or data stored in a database, and serve as an interface for the users of the database. For example, a. DBMS can be provided as an executable computer program (or software) product as is also known in the art.

It should also be noted that a database can be organized in accordance with a Data Model. Some notable Data Models include a Relational Model, an Entity-relationship model, and an Object Model. The design and maintenance of a complex database can require highly specialized knowledge and skills by database application programmers, DBMS developers/programmers, database administrators (DBAs), etc. To assist in design and maintenance of a complex database, various tools can be provided, either as part of the DBMS or as free-standing (stand-alone) software products. These tools can include specialized Database languages (e.g., Data Description Languages, Data Manipulation Languages, Query Languages). Database languages can be specific to one data model or to one DBMS type. One widely supported language is Structured Query Language (SQL) developed, by in large, for Relational Model and can combine the roles of Data Description Language, Data Manipulation Language, and a Query Language.

Today, databases have become prevalent in virtually all aspects of business and personal life. Moreover, usage of various forms of databases is likely to continue to grow even more rapidly and widely across all aspects of commerce, social and personal activities. Generally, databases and DBMS that manage them can be very large and extremely complex partly in order to support an ever increasing need to store data and analyze data. Typically, larger databases are used by larger organizations, larger user communities, or device populations. Larger databases can be supported by relatively larger capacities, including computing capacity (e.g., processor and memory) to allow them to perform many tasks and/or complex tasks effectively at the same time (or in parallel). On the other hand, smaller database systems are also available today and can be used by smaller organizations. In contrast to larger databases, smaller databases can operate with less capacity.

A current popular type of database is the relational database with a Relational Database Management System (RDBMS), which can include relational tables (also referred to as relations) made up of rows and columns (also referred to as tuples and attributes). In a relational database, each row represents an occurrence of an entity defined by a table, with an entity, for example, being a person, place, thing, or another object about which the table includes information.

One important objective of databases, and in particular a DBMS, is to optimize the performance of queries for access and manipulation of data stored in the database. Given a target environment, an "optimal" query plan can be selected as the best option by a database optimizer (or optimizer). Ideally, an optimal query plan is a plan with the lowest cost (e.g., lowest response time, lowest CPU and/or I/O processing cost, lowest network processing cost). The response time can be the amount of time it takes to complete the execution of a database operation, including a database request (e.g., a database query) in a given system. In this context, a "workload" can be a set of requests, which may include queries or utilities, such as, load that have some common characteristics, such as, for example, application, source of request, type of query, priority, response time goals, etc.

Generally, data (or "Statistics") can be collected and maintained for a database. "Statistics" can be useful for various purposes and for various operational aspects of a database. In particular, "Statistics" regarding a database can be very useful in optimization of the queries of the database, as generally known in the art.

More recently, in-memory processing systems, including in-memory database systems have been developed where data is typically stored and processed in memory which can offer much faster processing times than systems that also store data for processing in non-volatile or persistent storages (e.g., Hard Disk Drives (HDD's, Solid Disk Drives (SOD), Flash memory).

Additionally, the forms in which data is stored have changed in recent years. For example, textual data, such as JSON data, is often stored in large blocks of unindexed data containing attribute-value pairs. This poses significant processing challenges at retrieval time.

SUMMARY

Various embodiments herein each include at least one of systems, methods, and software for generating, storing, and using indexes of semi-structured data in database tables, such as a non-unique secondary index (NUSI), a unique secondary index (USI), a join, and other database index types. One method embodiment includes creating and storing a NUSI for a database table based on column data stored in rows of the database table. The NUSI in some such embodiments identifying an offset to specific data included in the column data of at least some rows of the database table where the specific data is located.

BRIEF DESCRIPTION OF THE DRAWINGS

FIG. 1 is a NUSI row illustration, according to an example embodiment.

FIG. 2 is a NUSI row illustration, according to an example embodiment.

FIG. 3 illustrates a JSON document, according to an example, embodiment.

FIG. 4 illustrates NUSI subtable contents, according to an example embodiment.

FIG. 5 is a NUSI row illustration, according to an example embodiment.

FIG. 6 illustrates example NUSI table rows, according to an example embodiment.

DETAILED DESCRIPTION

Figure 7:
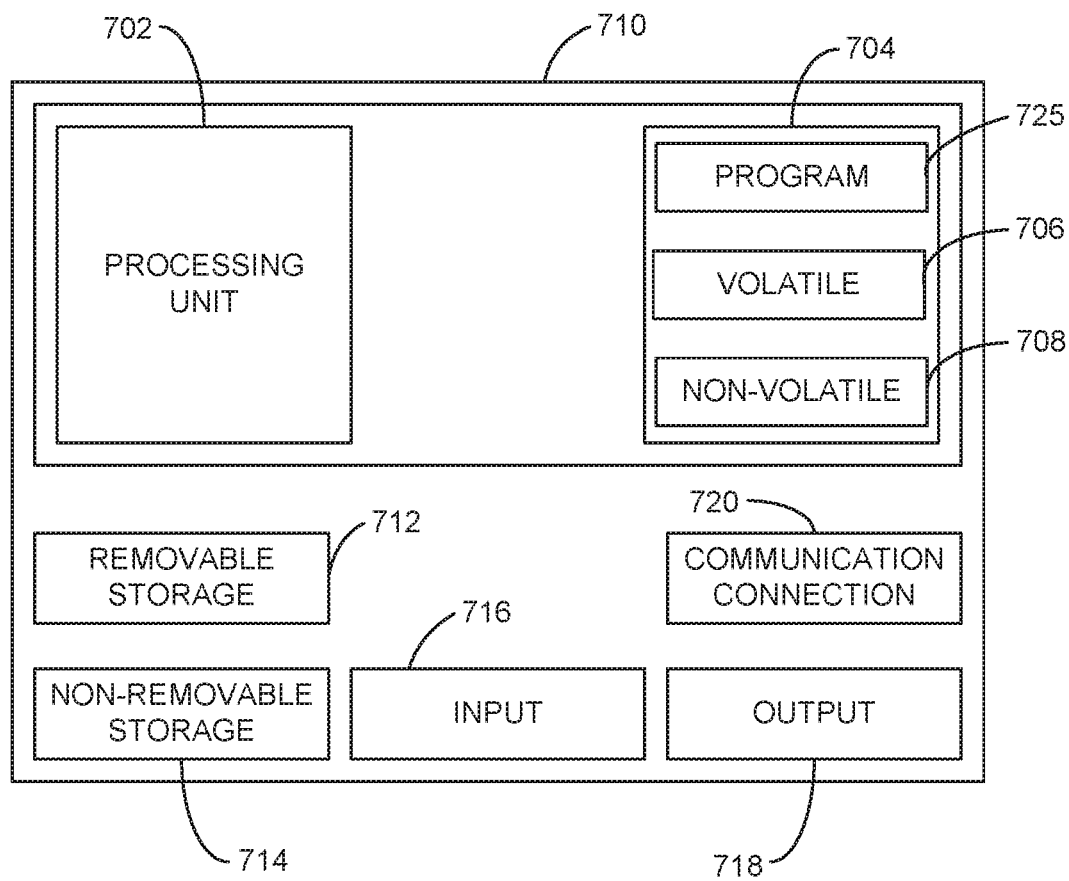
FIG. 7 is a block diagram of a computing device, according to an example embodiment.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

Because large-scale commercial database systems are updated often and include voluminous data, some commercial database systems, such as Teradata® (distributed by Teradata, Inc.), use a parallel scalable database model in which the rows of a user table are distributed amongst execution units known as Access Module Processors (AMPs). To better understand this architecture, consider the following: Given a database configured with 100 AMPs and a SQL user's table containing 100,000 rows, an ideal distribution is to distribute the rows such that 1000 rows sit on each AMP. Distributing the rows in such a manner as this fosters an improvement in performance in that in solving a query that must examine all 100,000 rows; each AMP is only required to look at its 1000. Thus the query can be solved in $\frac{1}{100}^{th}$ the time that it would be solved had only 1 AMP worked on the data.

In some such Relational Database Management System (RDBMS), Non-Unique Secondary Index (NUSI) is a kind of index that is built on an AMP locally. When a SQL query specifies a conditional clause referencing NUSI column(s), NUSI access is chosen instead of a full base table scan. Internally, NUSI rows may be built in the format illustrated in FIG. 1. In some RDBMSs, you must specify all the columns of a NUSI for it to be used in a query, while in other RDBMSs, you need only to specify a subset of contiguous fields. For example, some RDBMSs, with regard to a NUSI including fields A, B, and C, may require a query to include each of A, B, and C in a query. However, other RDBMSs may not, such as a query based on A and C, but not B or just C, for example.

In some NUSI embodiment herein, each unique key value has an index row and a list of the row IDs of the base table rows containing the given key value. A row ID is a pointer to a row where the subject data of the NUSI is stored. As the data of a NUSI may be spread across many rows, a NUSI may include may different row IDs. The row id of each qualified row is lined up in the same row serving as a pointer to directly access those base table rows instead of having to perform a full base table scan in which we would need to filter each base row for qualification.

In some embodiments, the traditional NUSI is extended to allow JSON Path expression to be specified as a NUSI and is used to speed up the search of a particular JSON document.

Currently to select rows based on objects within a JSON column, a full scan of the base table must be executed, which involves scans of rows and columns. To locate JSON objects, a scan through the JSON column is needed. When the size of JSON column is huge, which could be as big as 2 GB and even larger in some databases, the scan of rows and JSON data is very costly. In various embodiments herein, the NUSI index structure is extended to be able to directly indicate which base table rows contain a specific value within a JSON object. In addition, either the offset or the value of the immediate parent object containing a specific value within a JSON document will be saved, thereby making the evaluation of where expressions on the JSON object much more performant. Thus, expensive row and column scans are avoided once the index is built.

Note that in various embodiments, multiple formats of JSON data are supported, such as JSON text, BSON, UBJSON, eXtensible Markup Language (XML), and the like. BSON is binary-encoded and UBJSON embed the object length and type next to each object to enhance traversal and retrieval whereas JSON text is purely text format. Like JSON, there is not any indexing in BSON or UBJSON data to directly access a given attribute-value pair. These dataforms require scanning from the very beginning of a subject document or object to locate a sought after attribute-value pair. Note as well that other similar text-based and non-text based data formats are also supported in other embodiments.

Various embodiments herein enhance the NUSI expression for DOT Notation Syntax so that the access of base table row happens on the object level instead of row level. Two specific embodiment options include:
1) Offset option: in NUSI row, after each base table row id, add 2 or more extra bytes to indicate the offset to the immediate parent object.
2) Value option: in NUSI row, after each base table row id, store the value of the immediate parent object.

Details of embodiments of these two options are provided in detail below.

Offset Option

For to Offset option, a NUSI Subtable Row Layout (size in bytes) is illustrated in FIG. 2. As you can see in FIG. 2, such embodiments add extra bytes for each base table rowid to indicate the offset of the immediate parent object of the DOT notation expression value. The number of bytes added can be as small as two, but can also be four or more bytes depending on the amount of data that may be held in a column of a database table where the JSON or other data format of the particular embodiment is stored. The offset may be calculated from the start of the JSON document to the '{' character of the immediate parent object. For example, the object offset1 of row1 is the number of bytes from the '{' before "store" to the '{' before "category": "reference", "author": "Nigel Rees", "title": "Sayings of the Century", "price": 8.95 . . . .

CREATE TABLE JsonTable (storeID Integer, jsonCol JSON(1200));
INSERT INTO JsonTable VALUES (1, NEW JSON('{"store": { "book": [ { "category": "reference", "author": "Nigel Rees", "title": "*Sayings of the Century*","price": 8.95 },{ "category":

-continued

"fiction","author": "Evelyn Waugh", "title": "*Sword of Honour*", "price": 12.99 }], "bicycle": { "color": "red", "price": 19.95 } } }' ));
INSERT INTO JsonTable VALUES (2, NEW JSON('{ "store": { "book":[{ "category": "fiction", "author": "Herman Melville","title": "*Moby Dick*","isbn": "0-553-21311-3","price": 8.99 },{ "category": "fiction","author": "J. R. R. Tolkien", "title": "*The Lord of the Rings*", "isbn": "0-395-19395-8","price": 22.99 }] } }' ));
CREATE INDEX AuthorPath (jsonCol.store.book[*].author) ON JsonTable;

FIG. 3 illustrates a JSON document in the JsonCol column of the JsonTable that the above instruction executes upon.

FIG. 4 illustrates NUSI subtable contents as generated from the above instruction.

With regard to such an embodiment, suppose there is a query asking the titles of all of the books authored by "Nigel Rees" and with a price that is less than twenty dollars. Such a query may take the form of:
Select jsonCol.store.book[*].title from JsonTable where jsonCol.store.book[*].{author='Nigel Rees' & price<20.00};

As you can see, performance is improved with the above enhanced expression NUSI 'AuthorPath'. First the system searches for the index row with key 'Niguel Rees'. Then the system looks at the first base table reference. The system locates the base row using the rowid1, and then uses the object offset to object1a of FIG. 3 to jump to the matching object and see if its price is less than twenty dollars. The system finds out this is a matching object. After that, the system looks at the second base table reference and locates the base row using the rowid2. The system then uses the object offset to object2b of FIG. 3 to jump to the matching object and checks to see if the price is less than twenty dollars. The system finds out this is also a matching object to return.

The result of the above query would therefore be two rows and one column of data would be returned with the titles of the books "Saying of the Century" and "My Radio Times."

Value Option

The value option is similar to the offset option, but adds actual data to the NUSI table. FIG. 5 illustrates an example row layout according to some embodiments of the value option. Based on this layout and in the same context as the above example described with regard to the offset option, assume the same NUSI is defined:
CREATE INDEX AuthorPath (jsonCol.store.book[*].author) ON JsonTable;
The corresponding NUSI rows will contain different content as illustrated in FIG. 6.

Comparison of the Offset and Value Options

The offset option is generally simpler to implement and involves less overhead in terms of storage. However, in the value option, the NUSI can act like a covered NUSI for some queries, such as the query mentioned in the description of solution. That query is:
Select jsonCol.store.book[*].title from JsonTable where jsonCol.store.book[*].{author='Nigel Rees' & price<20.00};

Note that a covered index, as in the covered NUSI referred to above, is a database index that contains an index on certain data columns that are needed in a query. When a column is included in the index, the column is covered by the index. Thus, a covered NUSI is a NUSI that is indexed based on the column of interest.

In value option, for queries that the NUSI is not a fully covered NUSI, the NUSI row can still be evaluated before the primary row is fetched. For example, the query as below:

Select jsonCol.store from JsonTable where jsonCol.store.book[*].{author='Nigel Rees' & price<20.00};

With the value option, modification to other objects in the same JSON document would NOT affect the NUSI row. While for the offset option, a check or update of all the affected NUSI rows may be needed which means when any name or value of an object is updated, even if it is not the NUSI key, all the NUSI rows referring to the same row id may also need to be updated, or at least checked if an update is needed. Updates may affect several NUSI rows. Conceptually embodiments herein with the NUSI row enhanced with "rowid,offset" is analogous to a special object-level index based on offset. Therefore, for any update which would affect the offset of its immediate parent object, the index may need to be updated accordingly. Because a field of a JSON document, as well as other data fields or columns in row data, can be of variable length and modification of any field can affect offsets of its downstream items.

In summary, value option embodiments may be a good choice to enhance system performance with regard to JSON and other similar types of data when the size of the object is small. However, when an object is either big in size or is an array, the object value may duplicate in many index rows. In this case, Offset option may be a more appealing choice.

FIG. 7 is a block diagram of a computing device, according to an example embodiment. The computing device of FIG. 7 is an example of a computing device on which one or more of the embodiments illustrated and described herein may be implemented, in whole or in part. For example, all or a portion of a database management system may be implemented on one or more instances of the computing device of FIG. 7.

In one embodiment, multiple such computer systems are utilized in a distributed network to implement multiple components in a transaction based environment. An object-oriented, service-oriented, or other architecture may be used to implement such functions and communicate between the multiple systems and components. One example computing device in the form of a computer 710, may include a processing unit 702, memory 704, removable storage 712, and non-removable storage 714. Memory 704 may include volatile memory 706 and non-volatile memory 708. Computer 710 may include—or have access to a computing environment that includes—a variety of computer-readable media, such as volatile memory 706 and non-volatile memory 708, removable storage 712 and non-removable storage 714. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 710 may include or have access to a computing environment that includes input 716, output 718, and a communication connection 720. The computer may operate in a networked environment using a communication connection to connect to one or more remote computers, such as database servers. The remote computer may include a personal computer (PC), server, router, network a peer device or other common network node, or the like. The communication connection may include a Local Area Network (LAN), a Wide Area Network (WAN) or other networks.

Computer-readable instructions stored on a computer-readable medium are executable by the processing unit 702 of the computer 710. A hard drive. CD-ROM, and RAM are some examples of articles including a non-transitory computer-readable medium. For example, a computer program 725 capable of providing a generic technique to perform access control check for data access and/or for doing an operation on one of the servers in a component object model (COM) based system according to the teachings of the present invention may be included on a CD-ROM and loaded from the CD-ROM to a hard drive. The computer-readable instructions allow computer 710 to provide generic access controls in a COM based computer network system having multiple users and servers.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:

creating and storing a non-unique secondary index (NUSI) for a database table based on column data stored in rows of the database table wherein each row of the database table is associated with a respective one of a plurality of processing units, wherein each of the plurality of processing units respectively manages each associated row, the index comprising index data for each indexed item, wherein the index data for each indexed item includes at least a database table row ID, a unique key identifier, and an offset to specific data included in the column data of at least some rows of the database table where the specific data is located, and wherein the index is created locally at one of the plurality of the processing units;

providing the index as an enhanced index for JSON document objects of a database, each JSON document object housed in a single unique entry of the database table; and accessing, by the database, the index to locate a specific value within a specific JSON document housed in a specific entry of the database table based on a query submitted for execution by the database and without scanning the entire specific JSON document to locate the specific value.

2. The method of claim 1, wherein the specific data is a data object.

3. The method of claim 1, wherein index data for each indexed item includes an offset within data of the row of the row identifier to where particular data begins.

4. The method of claim 1, wherein the index for each indexed item data further includes an object represented in the specific instance of the further index data, and a value dataset of object data copied from the particular database table row of the database table row ID.

5. The method of claim 1, wherein the value dataset has a data length of no more than the indicator of the length of an object represented in the specific instance of the further index data.

6. A non-transitory computer readable storage medium, with instructions stored thereon, which when executed by a computer processor cause a computer to perform data processing activities comprising:

creating and storing an index a non-unique secondary index (NUSI) for a database table based on column data stored in rows of the database table, wherein each row of the database table is associated with a respective one of a plurality of processing units, wherein each of the plurality of processing units respectively manages each associated row, the index comprising index data for each indexed item, wherein the index data for each indexed item includes at least a database table row ID, a unique key identifier, and an offset to specific data included in the column data of at least some rows of the database table where the specific data is located, and wherein the index is created locally at one of the plurality of the processing units;

providing the index as an enhanced index for JSON document objects of a database, each JSON document object housed in a single unique entry of the database table; and accessing, by the database, the index to locate a specific value within a specific JSON document housed in a specific entry of the database table based on a query submitted for execution by the database and without scanning the entire specific JSON document to locate the specific value.

7. The non-transitory computer readable storage medium of claim 6, wherein the specific data is a data object.

8. The non-transitory computer readable storage medium of claim 6, wherein index data for each indexed item includes an offset within data of the row of the row ID to where particular data begins.

9. The non-transitory computer readable storage medium of claim 6, wherein the index for each indexed item data further includes an indicator of the length of an object represented in the specific instance of the further index data, and a value dataset of object data copied from the particular database table row of the database table row ID.

10. The non-transitory computer readable storage medium of claim 6, wherein the value dataset has a data length of no more than the indicator of the length of an object represented in the specific instance of the further index data.

11. A system comprising:

at least one computer processor, at least one network interface device, and at least one memory device;

instructions stored on the at least one memory device that are executable by the at least one computer processor to perform data processing activities comprising:

creating and storing an index a non-unique secondary index (NUSI) for a database table based on column data stored in rows of the database table, wherein each row of the database table is associated with a respective one of a plurality of processing units, wherein each of the plurality of processing units respectively manages each associated row, the index comprising index data for each indexed item, wherein the index data for each indexed item includes at least a database table row ID, a unique key identifier, and an offset to specific data included in the column data of at least some rows of the database table where the specific data is located, and wherein the index is created locally at one of the plurality of the processing units;

providing the index as an enhanced index for JSON document objects of a database, each JSON document object housed in a single unique entry of the database table; and accessing, by the database, the index to locate a specific value within a specific JSON document housed in a specific entry of the database table based on a query submitted for execution by the database and without scanning the entire specific JSON document to locate the specific value.

12. The system of claim 11, wherein the specific data is a data object.

13. The system of claim 11, wherein index data for each indexed item includes an offset within data of the row of the row ID to where the particular data begins.

14. The system of claim 11, wherein the further index data for each indexed item further includes an indicator of the length of an object represented in the specific instance of the further index data, and a value dataset of object data copied from the particular database table row of the database table row ID.

* * * * *